No. 889,825. PATENTED JUNE 2, 1908.
E. S. STIMPSON.
FILLING FORK FOR LOOMS.
APPLICATION FILED MAR. 6, 1907.
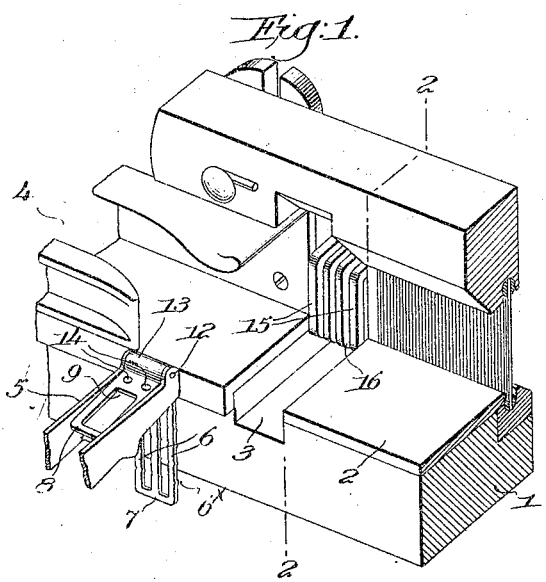
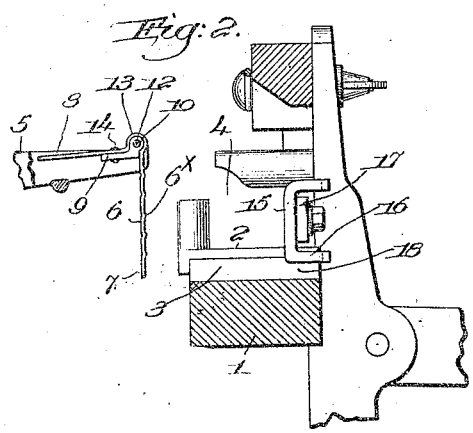 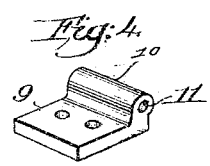
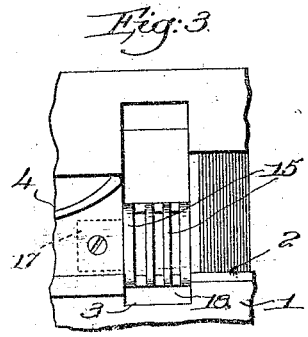
Witnesses,
Edward G. Allen.
Joseph M. Ward.
Inventor,
Edward S. Stimpson
by Crosby Gregory
Attys.

UNITED STATES PATENT OFFICE.

EDWARD S. STIMPSON, OF HOPEDALE, MASSACHUSETTS, ASSIGNOR TO DRAPER COMPANY, OF HOPEDALE, MASSACHUSETTS, A CORPORATION OF MAINE.

FILLING-FORK FOR LOOMS.

No. 889,825.

Specification of Letters Patent.

Patented June 2, 1908.

Application filed March 6, 1907. Serial No. 360,811.

*To all whom it may concern:*

Be it known that I, EDWARD S. STIMPSON, a citizen of the United States, residing in Hopedale, county of Worcester, and State of Massachusetts, have invented an Improvement in Filling-Forks for Looms, of which the following description, in connection with the accompanying drawing, is a specification; like letters on the drawing representing like parts.

This invention has for its object the production of improved filling-detecting mechanism for looms, and relates more particularly to the construction of the detector or fork.

The tines of filling-forks frequently are bent in the operation of the loom, and usually the tines are not all bent at once, but one tine may be bent out of parallelism with the others. Various causes account for the bending but perhaps it occurs most frequently when a shuttle is caught between the fork and the grid. Occasionally the protector mechanism will get out of order, so that if the shuttle is not boxing properly the dagger fails to catch in the frog, and the lay may come to front center with the shuttle out of the box. If the shuttle is in the shed a smash occurs, and if it is in the path of the fork it is very apt to bend it, and in many cases the fork is not straightened out properly, or if straightened, it does not take much of a blow to again put it out of alinement. Manifestly if a fork tine is bent sufficiently to strike a bar of the grid it will be tilted whether or not filling is present, and if the filling is absent a thin place in the cloth results. It often happens that a fork tine is bent so slightly that it will just graze a bar of the grid occasionally, depending upon the variable sidewise movement of the lay, and then the bend is very hard to detect.

It is well known by those engaged in the practical operation of looms that with the ordinary form of filling-fork, in which the tines are separated at their lower ends, a loop or trailing end of filling is very apt to become entangled around one or more of the tines. This objection is obviated by the fork constructed in accordance with my present invention, as the tines are connected at their lower ends.

When the tines of a fork are not integral with the loop or tail one or more of the tines, or the tail itself, may become loose, and in fact such looseness is very apt to occur, and manifestly any such looseness tends to interfere with the proper detecting action of the fork. Such an objection is obviated herein by making the tines and tail or loop integral, as will appear hereinafter.

In accordance with my present invention I so construct the fork that the tines are kept in alinement, it is so strengthened that it can withstand without injury a blow of considerable force, and if it is bent at all all of the tines will be affected, so that there will be little trouble in locating the fault.

The various novel features of my invention will be fully described in the subjoined specification and particularly pointed out in the following claims.

Figure 1 is a perspective view of a portion of a loom with one embodiment of my present invention applied thereto; Fig. 2 is a transverse section on the line 2—2, Fig. 1, looking toward the left; Fig. 3 is a front elevation of the grating or grid; Fig. 4 is an enlarged perspective detail of the body of the filling-detector or fork.

The lay 1, shuttle-race 2 intersected by the transverse recess 3 for the passage of the fork-tines, the shuttle-box 4 (partly shown in Fig. 1) and the fork-slide 5, only the rear end thereof being shown in Figs. 1 and 2, may be and are all of substantially well known or usual construction, the nearer side of the fork-slide being broken out in Fig. 2.

In the present embodiment of my invention the fork-tines are joined at their lower ends by a transverse bar or connection, giving greatly added strength and stiffness thereto and insuring the bending of all of the tines if one is bent.

The tines 6 are herein shown of sheet metal, connected at their lower ends by a transverse bar 7, and herein the tines and bar are stamped or died out of a single piece of metal, making a very simple, cheap, and efficient construction, the loop-like tail 8 being integral with the tines. The body portion of the fork is preferably made as a casting, having a flat part 9 and a raised, transverse convex portion 10 having a hole 11 for the pivot pin 12, Figs. 1 and 2, by which the fork is pivotally mounted on the slide 5. Between the upper ends of the tines and the tail 8 the connecting metal is bent around the portion 10 of the body, as at 13, and secured by rivets or other fastenings 14 to the flat part 9.

The upright bars 15 of the grate or grid are turned rearwardly at their ends, at 16, and connected at the extremities of such extensions, an ear 17 on the grid serving to fasten it in place on the lay.

Referring to the drawings it will be seen that a clearance is left at 18, Fig. 2, between the lower ends of the grid bars and the bottom of the recess 3, so that the connection 7 can pass into the clearance when the filling is absent, the rearward turning of the ends of the grid bars permitting the fork tines 6 at such time to pass between the bars.

Herein I have shown the tines as crimped or corrugated, as at $6^\times$, in order to hold intact filling at the same point on the tines at which it first contacts therewith.

It sometimes happens that a fork strikes the filling against the grid and then, in tilting, is carried over the thread as the lay continues its forward movement, and this fault might be aggravated with the form of grid herein shown, where it is possible for the filling, if slack enough, to drop below the grid. By crimping the tines the thread is held upon the tines at the point of engagement, and the tines when tilted cannot be carried over the thread.

It will be manifest that the fork herein shown can be made very light and sensitive, for by making the tines of sheet metal their weight is reduced, and the stiffness and strength is secured by the transverse connection between their free or lower ends.

The stamping out of tines and tail from a single piece of metal is effected at a single operation, and the bending to fit the body, with the attachment of the sheet metal portion thereto, are simple and rapid operations.

Having described my invention, what I claim as new and desire to secure by Letters Patent, is:—

1. As an article of manufacture, a filling-fork comprising a body portion, a plurality of tines rigidly connected at their lower ends, and a tail, the tail, tines and rigid connection being integral and secured to the body portion, said tines being crimped or corrugated.

2. As an article of manufacture, a filling-fork having tines crimped or corrugated.

3. As an article of manufacture, a filling-fork comprising a cast metal body, and attached sheet-metal tines formed in one piece and crimped or corrugated.

4. As an article of manufacture, a filling-fork comprising a cast metal body, and attached tines of sheet-metal crimped or corrugated and integrally connected at their lower ends.

In testimony whereof, I have signed my name to this specification, in the presence of two subscribing witnesses.

EDWARD S. STIMPSON.

Witnesses:
 EUGENE BEAUDRY,
 CLARE HILL DRAPER.